(12) United States Patent
Osawa et al.

(10) Patent No.: US 9,876,927 B2
(45) Date of Patent: Jan. 23, 2018

(54) IMAGE FORMING APPARATUS HAVING A GUIDE MEMBER FOR REGULATING APPROACHING OF TWO CABLES

(71) Applicant: CANON KABUSHIKI KAISHA, Tokyo (JP)

(72) Inventors: Yuichiro Osawa, Kamakura (JP); Yu Shuhama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,531

(22) Filed: Dec. 7, 2015

(65) Prior Publication Data
US 2016/0088177 A1    Mar. 24, 2016

Related U.S. Application Data

(63) Continuation of application No. 13/423,575, filed on Mar. 19, 2012, now Pat. No. 9,237,248.

(30) Foreign Application Priority Data

Mar. 22, 2011   (JP) .................................. 2011-062616
Mar. 13, 2012   (JP) .................................. 2012-056053

(51) Int. Cl.
*H04N 1/00* (2006.01)
*G03G 21/16* (2006.01)
*G03G 15/00* (2006.01)

(52) U.S. Cl.
CPC ......... *H04N 1/00994* (2013.01); *G03G 15/60* (2013.01); *G03G 21/1633* (2013.01); *G03G 21/1647* (2013.01); *G03G 21/1652* (2013.01); *H04N 1/0083* (2013.01); *H04N 1/00543* (2013.01); *H04N 1/00551* (2013.01); *H04N 1/00554* (2013.01); *H04N 2201/0091* (2013.01)

(58) Field of Classification Search
CPC ...... H02B 1/202; H02B 1/26; H04N 1/00994; H04N 1/00551; H04N 1/00543; H04N 1/0083; H04N 1/00554; H04N 2201/0091; G03G 21/1652; G03G 21/1647; G03G 21/1633; G03G 15/60
See application file for complete search history.

(56) References Cited

U.S. PATENT DOCUMENTS 9,237,248 B2 *   1/2016  Osawa .............. H04N 1/00543
2002/0054305 A1 *   5/2002  Ogasahara ............ B41J 2/2132
                                                                358/1.8

(Continued)

FOREIGN PATENT DOCUMENTS

CN           2786923 Y      6/2006
CN         101196706 A      6/2008

(Continued)

*Primary Examiner* — Walter Yehl
(74) *Attorney, Agent, or Firm* — Canon USA, Inc., IP Division (57) ABSTRACT

An image reading device is movable between a first position and a second position spaced farther apart from an image forming device than the first position, and a regulating member configured to regulate respective positions of two cables maintains, when the image reading device is at the first position, the two cables, respectively, in a bent state in a direction away from each other.

8 Claims, 11 Drawing Sheets

(56) References Cited

U.S. PATENT DOCUMENTS

| | | | |
|---|---|---|---|
| 2002/0171880 A1* | 11/2002 | Yui | H03M 1/0827 358/505 |
| 2007/0047024 A1* | 3/2007 | Onose | H04N 1/00519 358/474 |
| 2008/0316547 A1* | 12/2008 | Kim | H04N 1/0083 358/474 |

FOREIGN PATENT DOCUMENTS

| | | |
|---|---|---|
| CN | 101329529 A | 12/2008 |
| JP | H10200688 A | 7/1998 |
| JP | 2007067811 A | 3/2007 |

* cited by examiner

| FREQUENCY | 180MHz | 650MHz |
|---|---|---|
| INTERNATIONAL STANDARD FOR RADIATION NOISE | 30dB | 37dB |
| AMOUNT OF GENERATION OF RADIATION NOISE | 27dB | 25dB |

| FREQUENCY | 180MHz | 650MHz |
|---|---|---|
| INTERNATIONAL STANDARD FOR RADIATION NOISE | 30dB | 37dB |
| AMOUNT OF GENERATION OF RADIATION NOISE | 35dB | 40dB |

FIG. 9C

IMAGE FORMING APPARATUS HAVING A GUIDE MEMBER FOR REGULATING APPROACHING OF TWO CABLES

CROSS-REFERENCE TO RELATED APPLICATION

This application is a Continuation of U.S. application Ser. No. 13/423,575, filed Mar. 19, 2012, which claims priority from Japanese Patent Application No. 2011-062616 filed Mar. 22, 2011 and Japanese Patent Application No. 2012-056053 filed Mar. 13, 2012, which are hereby incorporated by reference herein in their entireties.

BACKGROUND OF THE INVENTION

Field of the Invention

The present invention relates to an image forming apparatus including an image reading device that is movable with respect to an image forming device.

Description of the Related Art

In an image forming apparatus including an image reading device, a plurality of cables such as a signal cable configured to transmit an image signal read by the image reading device to an image forming device and a power cable configured to supply power for driving the image reading device connects the image forming device and the image reading device. If the image reading device is movable with respect to the image forming device, the cables connect the image forming device and the image reading device while a certain degree of slack is formed in each of the cables so that the cables can be freely deformed, following movement of the image reading device.

Figure 9A:
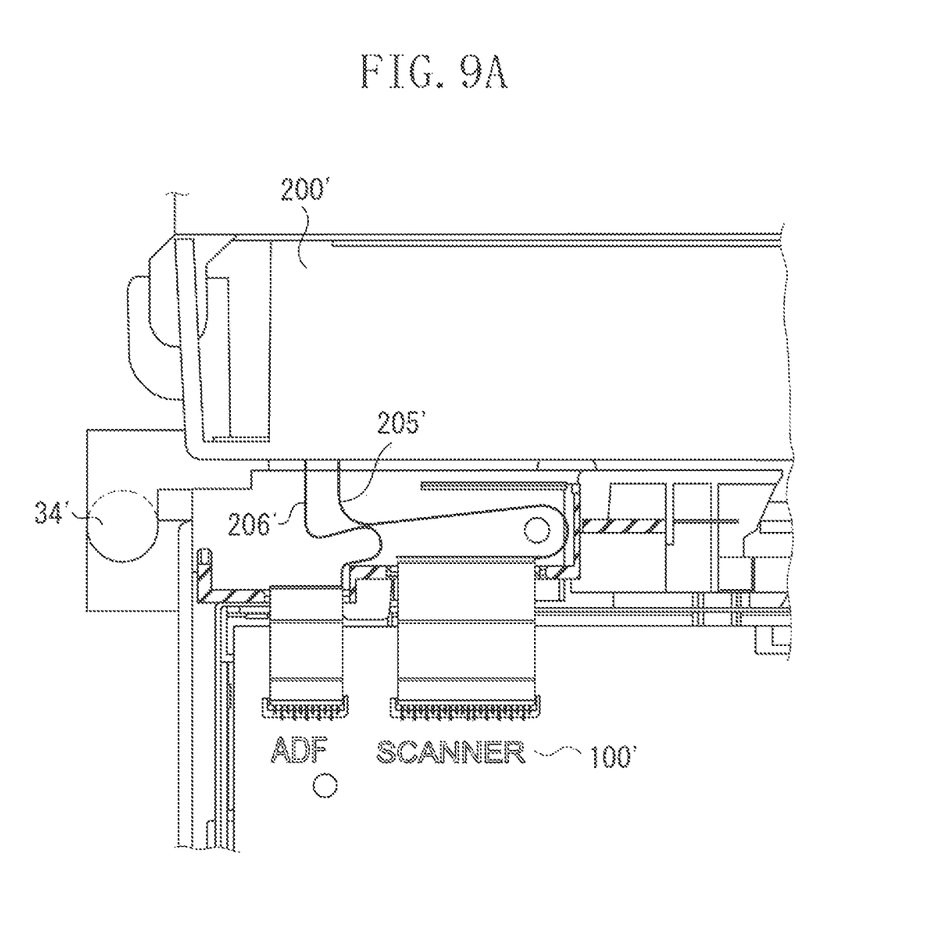
FIG. 9A is a cross-sectional view in the vicinity of a shaft 34 of an image forming apparatus in a comparative example as viewed from the left.

Such a configuration is illustrated in FIG. 9A. FIG. 9A is a cross-sectional view of the image forming apparatus as viewed from the side. An image reading device 200' is provided turnable around a rotation shaft 34' above an image forming device 100'. A signal cable 205' and a drive control cable 206' connect the image forming device 100' and the image reading device 200'. The signal cable 205' sends an image signal from the image reading device 200' to the image forming device 100'. The drive control cable 206' sends power for driving the image reading device 200' and a control signal from the image forming device 100' to the image reading device 200'. Each of the two cables has a length sufficient to connect the image forming device 100' and the image reading device 200' even while the image reading device 200' is turned to separate from the image forming device 100'. Consequently, while the image reading device 200' is not turned with respect to the image forming device 100', slack is formed in each of the two cables. Further, each of the two cables passes in the vicinity of the rotation shaft 34' so that useless slack need not be formed in the cable.

Slack is thus formed in each of the signal cable 205' and the drive control cable 206'. Therefore, an area where the two cables approach or contact each other may be formed. When the cables approach or contact each other, there may occur a phenomenon that signals respectively flowing through the cables electromagnetically interfere with each other, and noise is superimposed on the signal flowing through each of the cables, so that radiation noise generated from the cable increases.

Particularly, an amount of data transmitted through the signal cable 205' increases with increasing reading precision and reading speed in recent years, and a frequency of the signal flowing through the signal cable 205' is high. Thus, power of the radiation noise is high, and the signal cable 205' electromagnetically interferes with the drive control cable 206', so that noise easily flows through the drive control cable 206'. When the noise flows through the drive control cable 206', the noise resonates in the apparatus main body. Thus, high-level radiation noise may be generated.

As a measure against such radiation noise, Japanese Patent Application Laid-Open No. 2002-344703 discusses a configuration in which a ground wire is arranged every other one of a plurality of bundled wires arranged parallel to one another in a flat flexible cable (FFC) to prevent radiation noise.

It is also known that radiation noise is suppressed by covering a cable with a ferrite core.

SUMMARY OF THE INVENTION

According to an aspect of the present invention, an image forming apparatus includes an image forming device configured to form an image on a sheet, and an image reading device configured to read an image on a document, in which the image reading device is movable between a first position and a second position spaced farther apart from the image forming device than the first position, two cables each configured to connect the image reading device and the image forming device, and a regulating member configured to regulate respective positions of the two cables, in which the regulating member maintains, when the image reading device is at the first position, the two cables, respectively, in a bent state in a direction away from each other.

According to another aspect of the present invention, an image forming apparatus includes an image forming device configured to form an image on a sheet, and an image reading device configured to read an image on a document, in which the image reading device is movable between a first position and a second position spaced farther apart from the image forming device than the first position, two cables each configured to connect the image reading device and the image forming device, and a regulating member configured to regulate respective positions of the two cables, in which the regulating member regulates, when the image reading device is at the second position, the two cables, respectively, to be bent in a direction away from each other.

According to yet another aspect of the present invention, an image forming apparatus includes an image forming device configured to form an image on a sheet, and an image reading device configured to read an image on a document, in which the image reading device is movable between a first position and a second position spaced farther apart from the image forming device than the first position, two cables each configured to connect the image reading device and the image forming device, in which one of the two cables extends from the image reading device and/or the image forming device in a direction away from the other cable, and the other cable extends from the image reading device and/or the image forming device in a direction away from the one cable.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
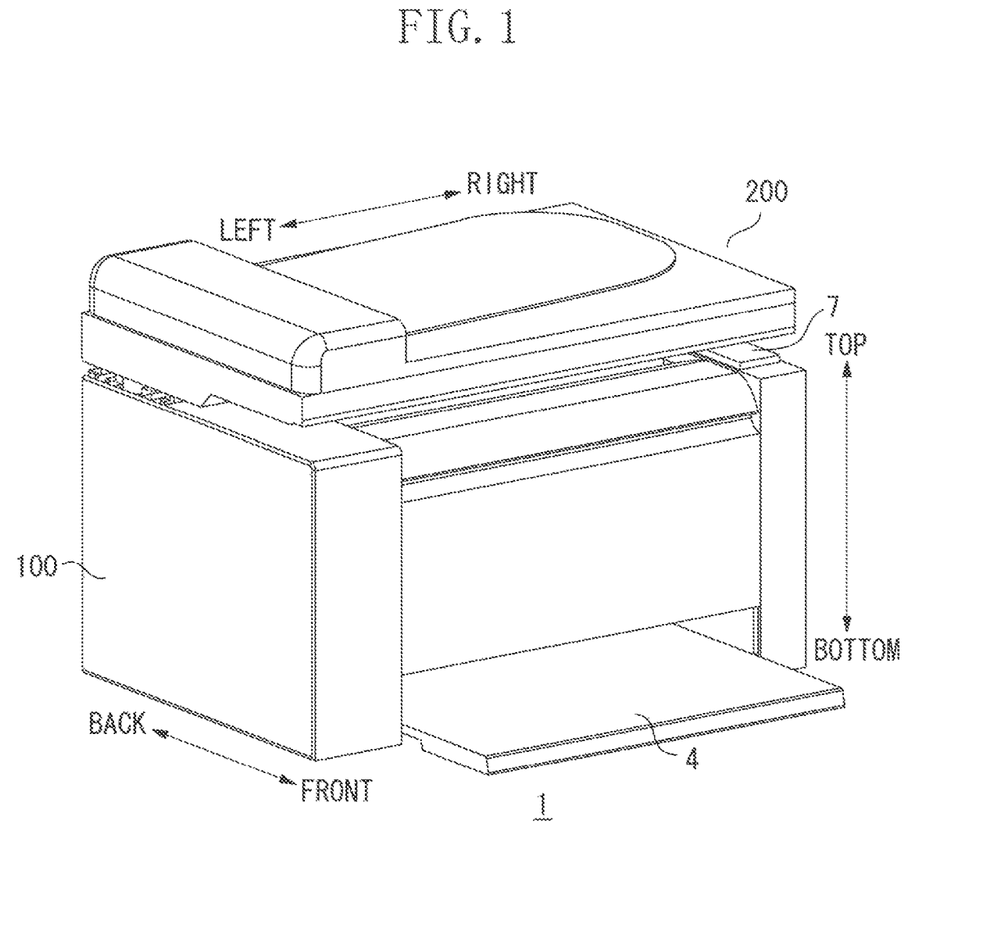
FIG. 1 is an external perspective view of an image forming apparatus.
Figure 2:
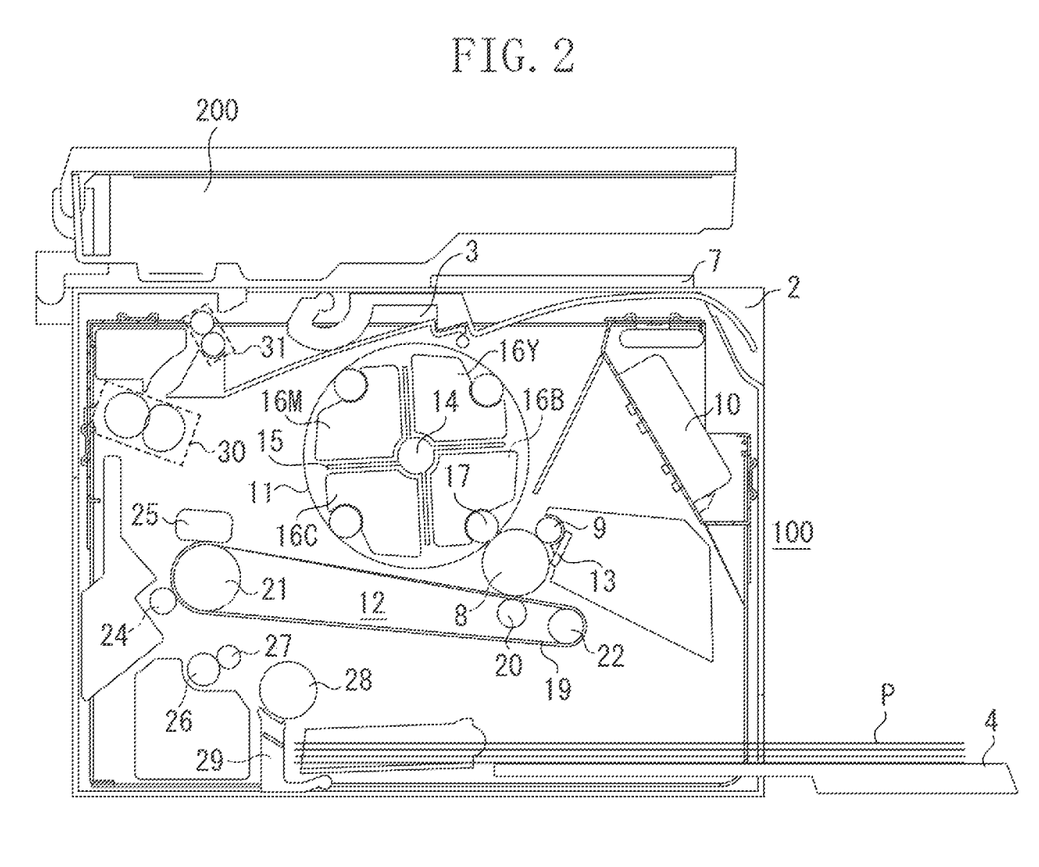
FIG. 2 is a cross-sectional view of the image forming apparatus as viewed from the left.

A first exemplary embodiment will be described. An image forming apparatus will be first described. FIG. 1 is an external perspective view of an image forming apparatus 1. FIG. 2 is a cross-sectional view of the image forming apparatus 1 as viewed from the left. In the following description, the front side of the image forming apparatus 1 is the side on which a cassette 4 of a recording medium is inserted/removed. The back side is the side opposite thereto. A front-back direction is a direction toward the front from the back of the image forming apparatus 1 (a forward direction) and/or a direction opposite thereto (a backward direction). The right and left sides are the right and the left as viewed from the front. A right-left direction is a direction toward the left from the right (a leftward direction) and/or a direction opposite thereto (a rightward direction). One end in a longitudinal direction (an axial direction) of a photosensitive drum 8 is the driving side, and the other end thereof is the non-driving side.

The image forming apparatus 1 includes an image forming device 100 configured to form an image on a recording medium (a sheet) using an electrophotographic process. The image forming device 100 is a color laser printer capable of forming a full-cover image on the recording medium. The recording medium includes a sheet, an overhead projector (OHP) sheet, and a label, on which the image forming device 100 forms an image. The image forming device 1 forms an image on a sheet-shaped recording medium P based on an electrical image signal input to a control circuit unit (a control unit: a central processing unit (CPU) (not illustrated)) from an external host device such as a personal computer, an image reader, or a facsimile or an image reading device 200, for example. The control circuit unit transfers and receives various types of electrical information to and from the host device and an operation unit 7 disposed on the front side on an upper surface of the image forming apparatus 1 while collectively controlling an image forming operation of the image forming device 100 according to a predetermined control program and a reference table.

A configuration of the image forming apparatus 100 and an image forming method therefore will be described below. An electrophotographic photosensitive drum (hereinafter referred to as a photosensitive drum) 8, the axial direction of which matches the right-left direction of the image forming apparatus 1 is rotatably disposed. A charging unit 9, an exposure unit 10, a development unit 11, an intermediate transfer belt unit (hereinafter referred to as a transfer unit) 12, and a drum cleaning unit 13 are disposed around the photosensitive drum 8.

The charging unit 9 is a charging roller, and uniformly charges a surface of the photosensitive drum 8 to a predetermined polarity/potential. The exposure unit 10 is a scanner unit, and irradiates the photosensitive drum 8 with a laser beam, which has been modulated to correspond to image information, and the surface of the photosensitive drum 8 is scanned with the laser beam to form an electrostatic latent image on the surface of the photosensitive drum 8. The development unit 11 makes toner adhere to the electrostatic latent image formed on the photosensitive drum 8, and visualizes the toner as a toner image.

The development unit 11 is a development device of a rotary type, and includes a rotary (rotatable supporting member) 15, four development cartridges 16B, 16Y, 16M, and 16C removably mounted on the rotary 15, and a rotary driving mechanism configured to rotate the rotary 15. The development device 11 includes the rotary 15 that is rotatable around a central shaft 14 rotatably supported between right and left frames. Each of the development cartridges 16 is mounted on the rotary 15 at intervals of 90° in a rotational direction of the rotary 15. Each of the development cartridges 16 includes a development roller 17, a developer supply roller configured to supply a developer (toner) to the development roller 17, and a developer storage unit configured to store the developer. In the development cartridge 16B, the developer storage unit stores a black (B) developer. Similarly, the development cartridge 16Y, the development cartridge 16M, and the development cartridge 16C respectively store a yellow (Y) developer, a magenta (M) developer, and a cyan (C) developer.

The transfer unit 12 includes an intermediate transfer belt 19 in an endless belt shape made of a dielectric and having flexibility, and a primary transfer roller 20 for transferring a developer image formed on the surface of the photosensitive drum 8 onto the intermediate transfer belt 19, a belt driving roller 21, and a tension roller 22, on which the intermediate transfer belt 19 is hung and stretched. The transfer roller 20 and the photosensitive drum 8 oppose each other with the intermediate transfer belt 19 sandwiched therebetween, to form a primary transfer nip. A primary transfer bias is applied to the transfer roller 20 so that the toner image on the photosensitive drum 8 is drawn onto the intermediate transfer belt 19 and transferred onto the intermediate transfer belt 19 in the primary transfer nip.

When color image formation is started, the photosensitive drum 8 rotates in a counterclockwise direction illustrated in FIG. 2 while the charging unit 9 charges the surface of the photosensitive drum 8, and the exposure unit 10 forms an electrostatic latent image on the photosensitive drum 8. The development roller 17 makes the toner adhere to the electrostatic latent image and visualizes the latent image as a toner image at a position opposing the development unit 11. The primary transfer roller 20 transfers the toner image onto the intermediate transfer belt 19 in the primary transfer nip.

The photosensitive drum 8 then rotates, and the cleaning blade 13 cleans the toner remaining on the surface of the photosensitive drum 8, so that charging, exposure, and development are performed again. The rotary 15 sequentially moves the four development cartridges 16 to an image forming position at which the electrostatic latent image formed on the photosensitive drum 8 is to be developed, to sequentially develop the electrostatic latent image on the photosensitive drum 8. FIG. 2 illustrates a state where the development cartridge 16B is at the image forming position. The toner image on the photosensitive drum 8 is overlaid on and transferred onto the toner image, which has already been transferred onto the intermediate transfer belt 19. Such a cycle is performed for each of the development cartridges 16B, 16Y, 16M, and 16C, so that a toner image obtained by superimposing toner images in four colors can be obtained on the intermediate transfer belt 19.

A secondary transfer roller 24 is provided opposing the belt driving roller 21, and a secondary transfer nip is formed with the intermediate transfer belt 19 sandwiched therebetween.

A conveyance unit including a conveyance roller 26 and a conveyance counter roller 27 and a sheet feeding unit including a sheet feeding roller 28 and a counter pad 29 are arranged upstream, in the conveyance direction of recording media P, of the secondary transfer nip. A cassette 4 on which the recording media P are loaded is removably mounted on the apparatus main body. The sheet feeding roller 28 feeds the recording media P while pressing the recording media P against the counter pad 29 in the sheet feeding unit, to separate the recording media P into one sheet and feed one of the recording media P at a time into a conveyance unit. The conveyance unit rotates the conveyance roller 26 and feeds the fed recording medium P into the secondary transfer nip so that the recording medium P enters the secondary transfer nip in synchronized timing with the toner image on the intermediate transfer belt 19.

The secondary transfer roller 24 is arranged to be capable of abutting on and separating from the intermediate transfer belt 19, and is normally in a separating state and enters an abutting state when the recording medium P is fed into the secondary transfer nip to perform secondary transfer. The recording medium P enters the secondary transfer nip in synchronized timing with the toner image on the intermediate transfer belt 19. In this case, an opposite polarity to the polarity of the toner image is applied to the secondary transfer roller 24, and the toner image is drawn toward the secondary transfer roller 24, so that the toner image is transferred onto the recording medium P sandwiched between the intermediate transfer belt 19 and the secondary transfer roller 24.

On the intermediate transfer belt 19, a belt cleaning member 25 is arranged downstream of the secondary transfer roller 24 and upstream of the photosensitive drum 8 in the conveyance direction of the intermediate transfer belt 19. The belt cleaning member 25 recovers the toner that cannot be transferred onto the recording medium P in the secondary transfer nip. The cleaning member 25 retreats to such a position as not to function at a normal time, and moves to such a position as to function when a secondary transfer operation is performed.

A fixing unit 30 is arranged downstream, in the conveyance direction of the recording medium P, of the secondary transfer nip. The fixing unit 30 fixes the toner image on the recording medium P, which has been fed from the secondary transfer nip, onto the recording medium P by applying heat and pressure to the recording medium P.

A sheet discharge unit 31 is arranged downstream, in the conveyance direction of the recording medium P, of the fixing unit 30. The sheet discharge unit 31 discharges the recording medium P fed from the fixing unit 30, and loads the recording medium P on the sheet discharge tray 3. In the above-mentioned configuration, the image forming device 100 forms an image on the recording medium P.

The image forming device 100 according to the present exemplary embodiment has been described as performing color electrophotographic image formation using a rotary development system. However, the image forming device 100 may perform electrophotographic image formation and monochrome image formation using an inline system including a plurality of photosensitive drums and image formation using another system such as an inkjet system.

(Image Reading Device)

Figure 3A:
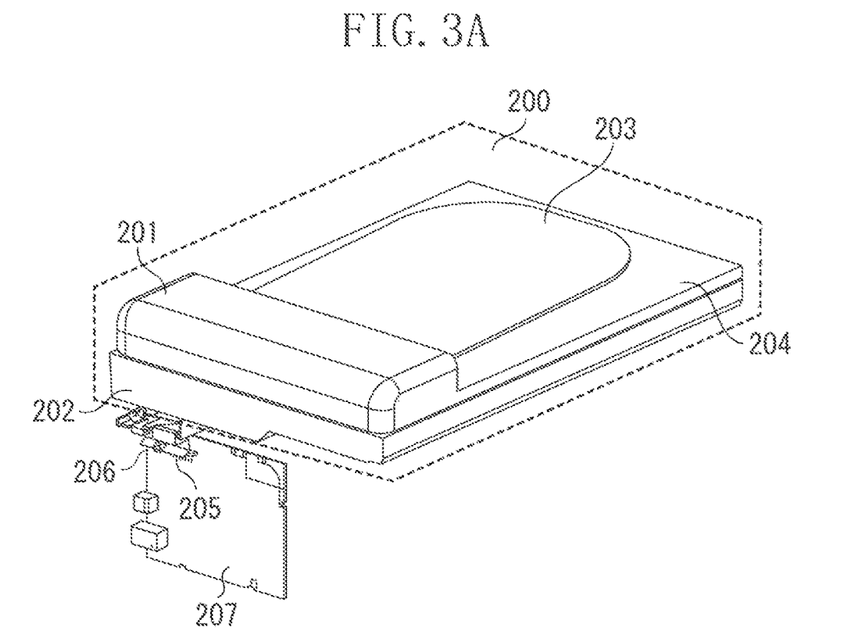
FIG. 3A is a perspective view of an image reading device and a part of an image forming device with an automatic document feeder (ADF) unit closed.
Figure 3B:
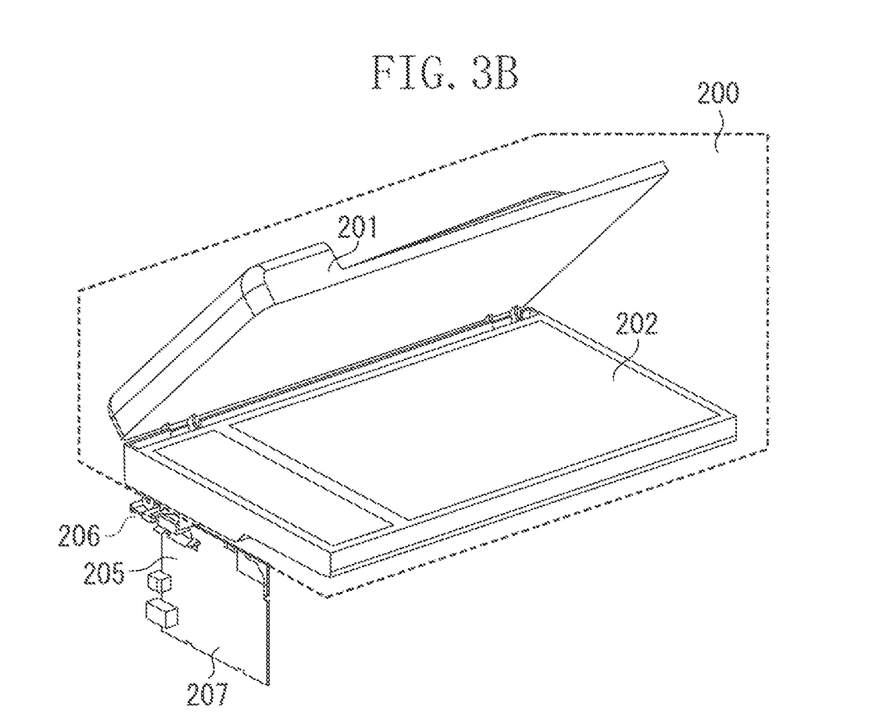
FIG. 3B is a perspective view of the image reading device and a part of the image forming device with the ADF unit opened.

In the image forming apparatus 1 according to the present exemplary embodiment, an image reading device 200 is provided above the image forming device 100 with a space on which the recording medium P is loaded on the sheet discharge tray 3 sandwiched therebetween. The image reading device 200 will be described below. FIGS. 3A and 3B are perspective views of the image reading device 200 and a part of the image forming device 100, where FIG. 3A illustrates a state where an automatic document feeder (ADF) unit 201 is closed, and FIG. 3B illustrates a state where the ADF unit 201 is opened.

The image reading device 200 includes the ADF unit 201 and a document plate 202 including a platen glass. The ADF unit 201 is openable and closable by turning with respect to the document plate 202. A reading sensor (not illustrated) serving as a reading unit configured to read an image on a document is provided inside the document plate 202, and reads an image on a document laid on the document plate 202 or a document fed from the ADF unit 201, described below, and converts the image into an electric signal. The electric signal is fed as an image signal to a control board 207 in the image forming device 100 via a signal cable 205. The image forming apparatus 1 can form an image based on the image signal using the image forming device 100, and can feed a signal based on the image signal to an external host device such as a personal computer (PC). In the present exemplary embodiment, the signal cable 205 is a flexible flat cable (FFC) having a plurality of bundled wires (electric wires) formed therein in parallel alignment to have a planar shape.

Images on documents can be read by a method for opening the ADF unit 201 and laying one of the documents at a time on the document plate 202 or a method for laying the documents on a document tray 203 arranged in the ADF unit 201, automatically feeding one of the documents at a time to the document plate 202, and reading the document, to read the images on the plurality of documents at one time. When the document on the document plate 202 is read, a carriage including a reading sensor is moved along a surface of the document, to read a document image. When documents laid in the document tray 203 are read, one of the documents is conveyed at a time into the ADF unit 201 by an ADF roller (not illustrated) while being discharged to an ADF sheet discharge unit 204 after images on the documents are read at a position opposing the reading sensor.

While a motor (not illustrated) drives the carriage and the ADF roller, described above, its driving force is obtained by supplying power and a control signal to the motor from the control board 207 in the image forming device 100 via a drive control cable 206. In the present exemplary embodiment, the drive control cable 206 is a flexible flat cable (FFC) having a plurality of bundled wires (electric wires) formed therein in parallel alignment to have a planar shape.

Figure 4:
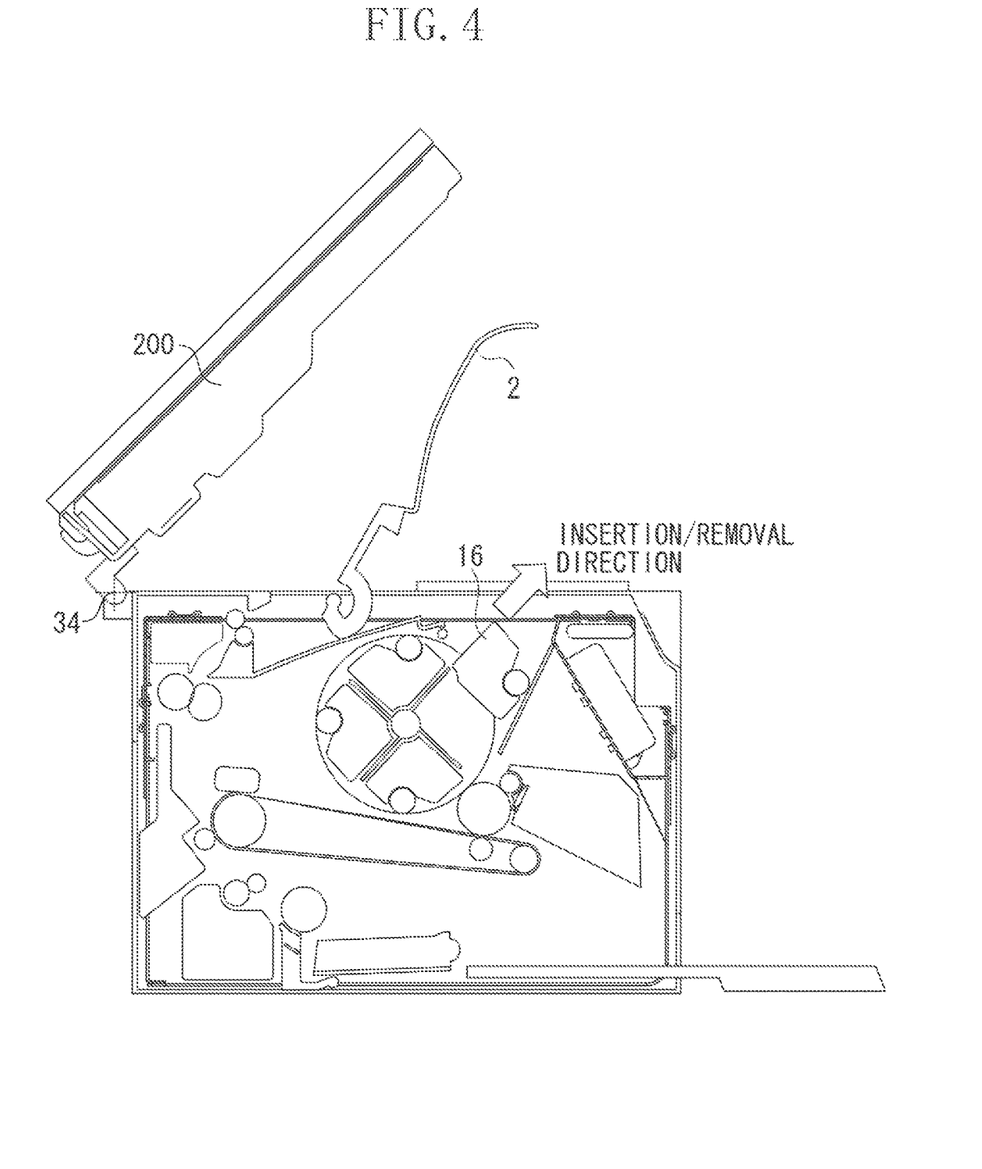
FIG. 4 is a cross-sectional view of the image forming apparatus as viewed from the left.

FIG. 4 is a cross-sectional view of the image forming apparatus 1 as viewed from the left. The image reading device 200 is turnable around a shaft 34 with respect to the image forming device 100 (the apparatus main body), and is movable between a closed position (first position) at which the image forming device 100 is closed and an opened position (second position) at which it is opened. The image reading device 200 is opened with respect to the image forming device 100, so that the recording medium P is easily taken out of the sheet discharge tray 3 and the development cartridge 16 can be removably mounted on the image forming device 100. More specifically, the image reading device 200 and an upper cover 2 of the image forming device 100 are turned upward, as illustrated in FIG. 4, so that the development cartridge 16 can be replaced by being inserted/removed in a direction indicated by an arrow.

(Cable Connecting Image Forming Device 100 and Image Reading Device 200)

As described above, the image reading device 200 is movable with respect to the image forming device 100. Therefore, the signal cable 205 and the drive control cable 206, which connect the image reading device 200 and the image forming device 100, are provided with a certain degree of allowance added to their lengths. More specifically, the signal cable 205 and the drive control cable 206 have lengths sufficient to connect the image reading device 200 and the image forming device 100 even while the image reading device 200 is opened with respect to the image forming device 100, so that there is a great distance therebetween. The signal cable 205 and the drive control cable 206 are arranged in the vicinity of the shaft 34 where the distance of connecting the image forming device 100 and the image reading device 200 hardly changes depending on whether the image reading device 200 is opened or closed. The signal cable 205 and the drive control cable 206 are thus arranged so that each of the cables can be inhibited from increasing in length and prevented from being in the way when the image reading device 200 is opened.

The signal cable 205 and the drive control cable 206 respectively have lengths sufficient to connect the image reading device 200 and the image forming device 100 without being stretched even while the image reading device 200 is opened with respect to the image forming device 100 so that there is a great distance therebetween, as described above. Therefore, the signal cable 205 and the drive control cable 206 respectively have lengths more than minimum lengths required to connect the image reading device 200 and the image forming device 100 while the image reading device 200 is closed with respect to the image forming device 100. Therefore, slack is formed in each of the signal cable 205 and the drive control cable 206. Both the signal cable 205 and the drive control cable 206 are arranged in close proximity to each other because they are connected to the common control board 207 in the image forming device 100. Thus, the signal cable 205 and the drive control cable 206 is significantly close to or in contact with each other while the image reading device 200 is closed with respect to the image forming device 100.

In this case, a high-frequency signal flows through the signal cable 205. The radiation noise becomes higher as the frequency becomes higher. Generally, a noise removal unit such as a ferrite core is provided on the signal cable 205 so that noise on the signal cable 205 is prevented from propagating between the image reading device 200 and the image forming device 100, to prevent radiation noise from being generated. Since the drive control cable 206 is in close proximity to the signal cable 205 in this configuration, however, the noise on the signal cable 205 may be transmitted to the drive control cable 206 at a place where the two cables are close to each other, to generate radiation noise. To prevent this, ferrite cores are required to be arranged on both sides of the signal cable 205, i.e., on the side of the image forming device 100 and the side of the image reading device 200 with respect to the place where the two cables are close to each other, and both noise from the image forming device 100 and noise from the image reading device 200 are required to be excluded. However, the ferrite core is high in cost. Therefore, the ferrite core is arranged only in the image reading device 200, as described above, in the present exemplary embodiment. Therefore, a measure against noise is insufficient for the signal cable 205. If the signal cable 205 is in close proximity to the drive control cable 206, high-level radiation noise may be generated.

If a ground wire is inserted between bundled wires, as discussed in Japanese Patent Application No. 2002-344703, a plurality of ground wires, which is not used for communication, is required to be provided, which raises cost.

In the present exemplary embodiment, slack in each of the signal cable 205 and the drive control cable 206 is controlled, to contrive to maintain a predetermined distance or more between both the cables. The contrivance will be described below.

(Control of Slack in Cable)

Figure 5:
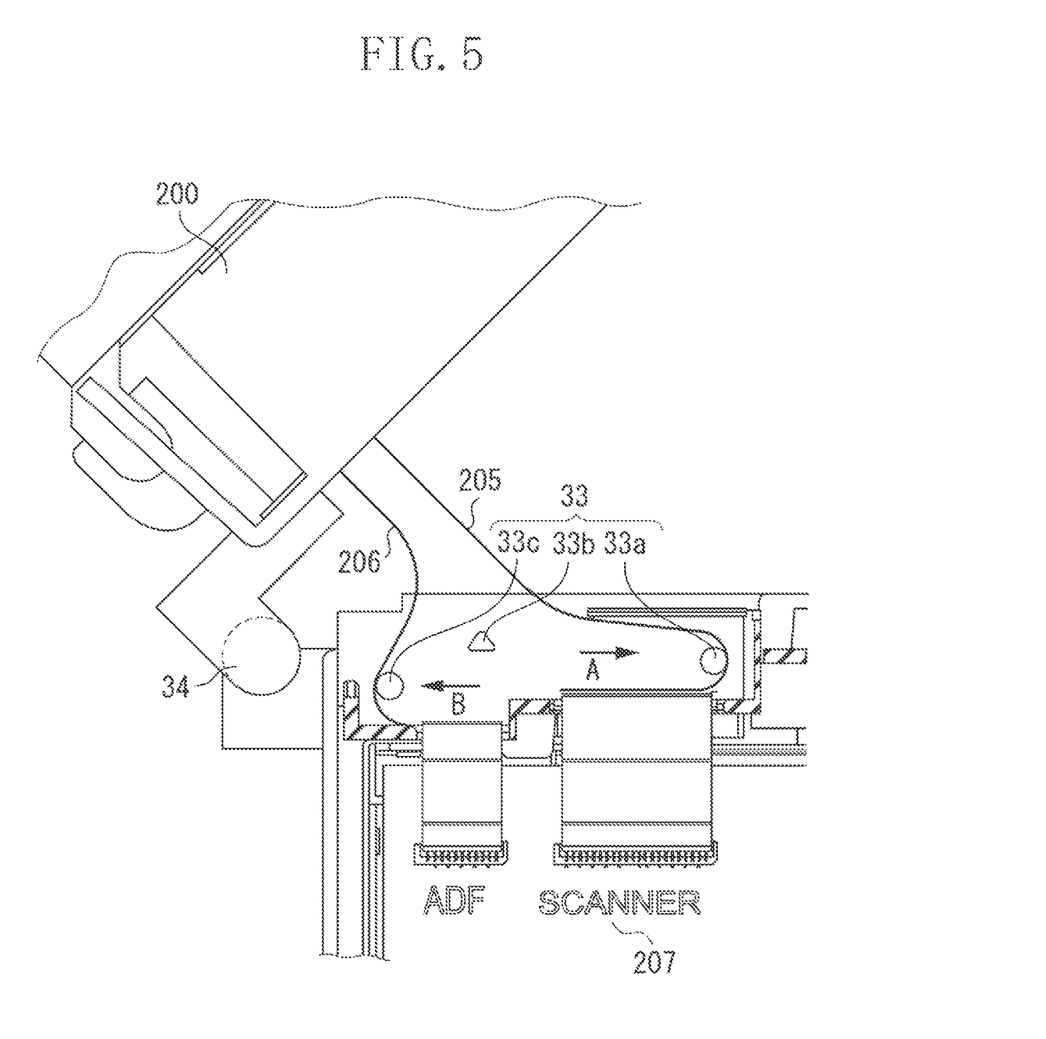
FIG. 5 is a cross-sectional view in the vicinity of a shaft 34 of the image forming apparatus with the image reading device opened as viewed from the left.
Figure 6A:
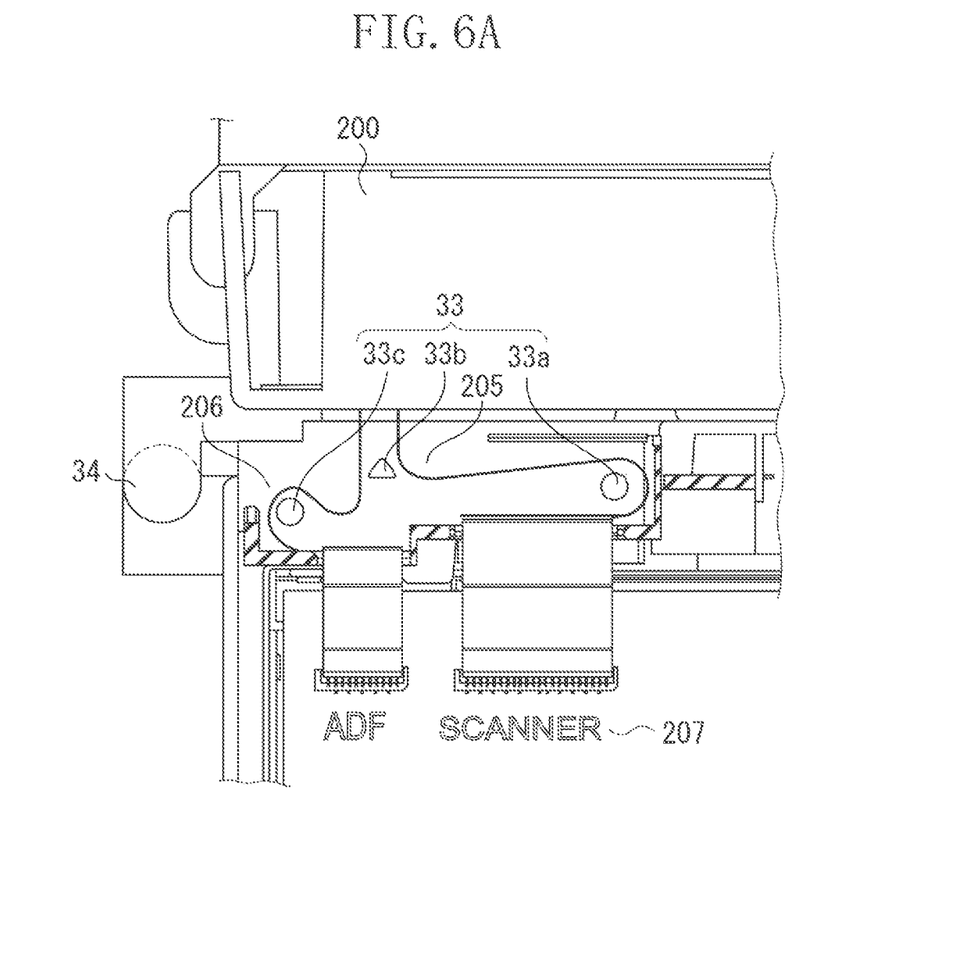
FIG. 6A is a cross-sectional view in the vicinity of the shaft 34 of the image forming apparatus with the image reading device closed as viewed from the left.

FIG. 5 is a cross-sectional view in the vicinity of the shaft 34 of the image forming apparatus 1 with the image reading device 200 opened as viewed from the left, and FIG. 6A is a cross-sectional view in the vicinity of the shaft 34 of the image forming apparatus 1 with the image reading device 200 closed as viewed from the left.

In the present exemplary embodiment, the signal cable 205 is folded in an A direction on the side of the image forming device 100 so that the signal cable 205 projects (extends) from the image forming device 100 in the A direction serving as a direction away from the drive control cable 206, as illustrated in FIG. 5. Similarly, the drive control cable 206 is folded in a B direction different from the A direction on the side of the image forming device 100 so that the drive control cable 206 projects (extends) from the image forming device 100 in the B direction serving as a direction away from the signal cable 205. More specifically, a direction in which the signal cable 205 and the drive control cable 206 project (extend) from the image forming device 100 is configured to be a direction in which both the cables are moving away from each other as the cables head toward the image reading device 200 from the image forming device 100. Thus, the signal cable 205 and the drive control cable 206 are respectively slackened in the A direction and the B direction while the image reading device 200 is closed. Therefore, the signal cable 205 and the drive control cable 206 are slackened in the directions away from each other. Thus, the possibility that both the cables approach each other and electromagnetically interfere with each other to generate high radiation noise can be reduced.

Further, in the present exemplary embodiment, the image forming device 100 includes guide members 33a, 33b, and 33c serving as a guiding unit configured to guide the signal cable 205 and the drive control cable 206 and regulate a shape of slack in each of the cables. Each of the guide members 33, 33b, and 33c has a projection shape made of plastic. The guide member 33a is hung with the signal cable 205 to separate the signal cable 205 from the drive control cable 206 while the image reading device 200 is closed. Similarly, the guide member 33c is hung with the drive control cable 206 to separate the drive control cable 206 from the signal cable 205 while the image reading device 200 is closed. The guide member 33b is provided at a position between the guide members 33a and 33c.

The guide member 33b regulates a position of the signal cable 205 so that a portion, which is approaching the drive control cable 206, of the signal cable 205 does not come too close to the drive control cable 206 when the signal cable 205 is slackened by closing the image reading device 200. Similarly, the guide member 33b regulates a position of the drive control cable 206 so that a portion, which is approaching the signal cable 205, of the drive control cable 206 does not come too close to the signal cable 205 when the drive control cable 206 is slackened by closing the image reading device 200. In sum, the guide members 33a, 33b, and 33c regulate the respective positions of the signal cable 205 and the drive control cable 206, to maintain the signal cable 205 and the drive control cable 206 in bent states in the directions away from each other while the image reading device 200 is closed. Therefore, at least one of the signal cable 205 and the drive control cable 206 is not bent in a direction nearer to the other cable.

The guide members 33a, 33b, and 33c guide the signal cable 205 and the drive control cable 206 to be slackened in the directions away from each other more reliably while the image reading device 200 is closed. Thus, the possibility that both the cables approach each other and electromagnetically interfere with each other to generate high radiation noise can be reduced.

The guide members 33a and 33c regulate respective positions of the signal cable 205 and the drive control cable 206 so that the signal cable 205 and the drive control cable 206 are slackened in the directions away from each other even while the image reading device 200 is opened. The signal cable 205 and the drive control cable 206 are thus slackened in the directions away from each other even while the image reading device 200 is opened so that the signal cable 205 and the drive control cable 206 can be smoothly slackened when the image reading device 200 is closed.

The effect of the present exemplary embodiment will be described below using a comparative example. FIG. 9A is a cross-sectional view in the vicinity of a shaft 34' of an image forming apparatus 1' in the comparative example as viewed from the left. The image forming apparatus 1' in the comparative example has a similar configuration to that of the image forming apparatus 1 according to the present exemplary embodiment except for control of slack in each of a signal cable 205' and a drive control cable 206'. Both the signal cable 205' and the drive control cable 206' project (extend) in an A direction from the image forming device 100'. A member for guiding both the cables, like the guide member 33 in the present exemplary embodiment, does not exist. Other conditions are similar to those in the present exemplary embodiment. The signal cable 205' is covered with a ferrite core in an image reading device 200'.

Figure 9B:
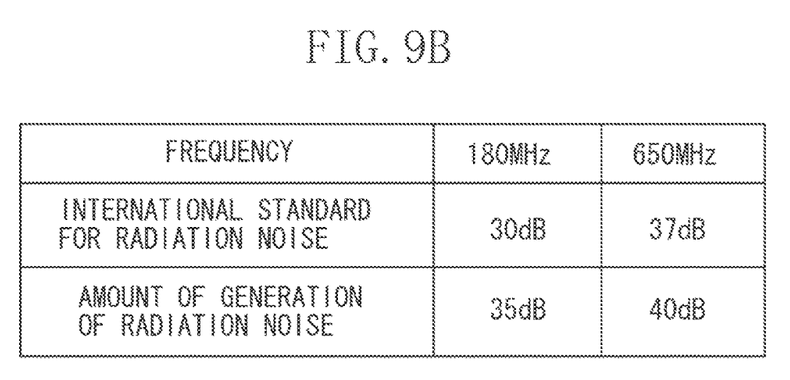
FIG. 9B is a table illustrating frequencies at which radiation noise generated and a level of the radiation noise in the image forming apparatus in the comparative example, and upper-limit levels of the radiation noise at the frequencies defined by an international standard.
Figure 9C:
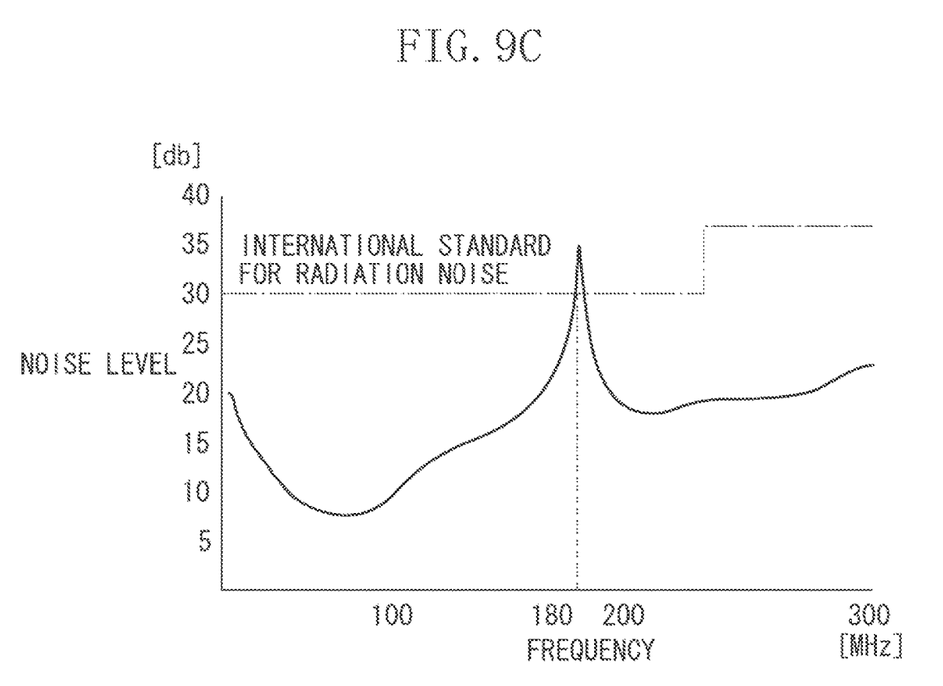
FIG. 9C is a graph of a noise level of the radiation noise in the image forming apparatus in the comparative example.

A case where the signal cable 205' and the drive control cable 206' are in contact with each other while the image reading device 200' is closed in the image forming apparatus 1' in the comparative example will be described. FIG. 9B is a table illustrating frequencies at which levels of radiation noise generated in the image forming apparatus 1' in the comparative example respectively exceed upper-limit levels defined by an international standard and the levels at the frequencies. In the image forming apparatus 1' in the comparative example, the radiation noise was generated at the levels exceeding the upper-limit levels defined by the international standard in two frequency bands of 180 Hz and 650 Hz. FIG. 9C is a graph illustrating an international standard for radiation noise and a level of radiation noise in the image forming apparatus 1' in the comparative example in the frequency band of 180 Hz.

Figure 6B:
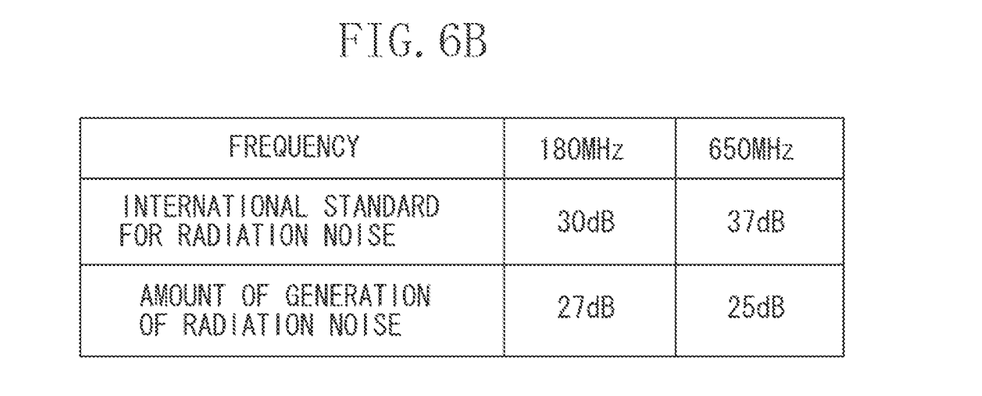
FIG. 6B is a table illustrating frequencies at which radiation noise generated and a level of the radiation noise in the image forming apparatus, and upper-limit levels of the radiation noise at the frequencies defined by an international standard.

Next, radiation noise in the image forming apparatus 1 according to the present exemplary embodiment will be described below. FIG. 6B is a table illustrating levels of radiation noise in the image forming apparatus 1 according to the present exemplary embodiment in the frequency bands of 180 Hz and 650 Hz at which the radiation noise was generated at the levels exceeding the upper-limit levels defined by the international standard in the image forming apparatus 1' in the comparative example, which were measured while the image reading device 200 is closed.

In the present exemplary embodiment, the respective directions in which the signal cable 205 and the drive control cable 206 project (extend) from the image forming device 100 are contrived and the guide member 33 is provided so that the two cables 205 and 206 are slackened to separate from each other while the image reading device 200 is closed. Consequently, even if a large number of ferrite cores are not used, a distance between the two cables 205 and 206 is increased, so that an amount of generation of the radiation noise can be made smaller than that in the international standard even in either one of the above-mentioned frequency bands.

The guide member 33 and the signal cable 205 and the drive control cable 206 are connected to each other at such positions that the two cables 205 and 206 are not prevented from being deformed as an operation for opening the image reading device 200 is performed.

In the present exemplary embodiment, the guide member 33 includes a guide member 33a that is hung with the cable 205, a guide member 33c that is hung with the cable 206, and a guide member 33b arranged between the cables 205 and 206, which are separately provided. Therefore, the deformation of the cables 205 and 206, following opening/closing of the image reading device 200, is not regulated more than necessary. The image reading device 200 can be smoothly opened and closed. Further, since the guide members 33a, 33b, and 33c are spaced a certain distance apart from one another, the cables 205 and 206 are not sandwiched among the guide members 33a, 33b, and 33c.

If the two cables 205 and 206 can be sufficiently spaced apart from each other by the directions in which the cables 205 and 206 project (extend) from the image forming device 100 and only the guide members 33a and 33c while the image reading device 200 is closed, the guide member 33b need not be provided.

Figure 7:
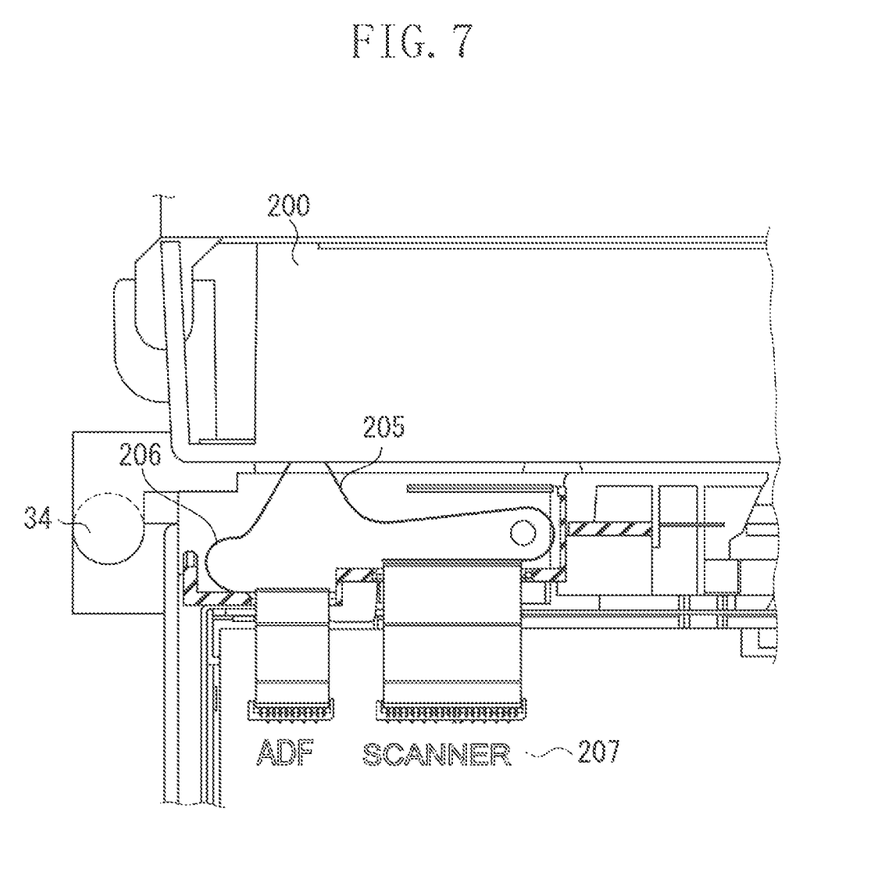
FIG. 7 is a cross-sectional view in the vicinity of a shaft 34 of an image forming apparatus in a modified example with an image reading device closed as viewed from the left.

A modified example of the present invention will be described below. FIG. 7 is a cross-sectional view in the vicinity of a shaft 34 of an image forming apparatus in the modified example with an image reading device 200 closed as viewed from the left. In the modified example, a signal cable 205 projects (extends) in a direction A from the image reading device 200. Similarly, a drive control cable 206 projects (extends) in a direction B from the image reading device 200. More specifically, the direction in which each of the signal cable 205 and the drive control cable 206 projects (extends) from the image reading unit 200 is a direction in which the cable is moving away from the other cable as the cable heads toward the image reading device 200 from the image forming device 100.

Since the image forming apparatus is thus configured, the signal cable 205 and the drive control cable 206 are slackened (bent) in directions away from each other while the image reading device 200 is closed. Therefore, the possibility that both the cables 205 and 206 approach each other and electromagnetically interfere with each other to generate high radiation noise can be reduced. In this modified example, each of the signal cable 205 and the drive control cable 206 projects (extends) from the image reading device 200 and the image forming device 100 in the direction away from the other cable. Thus, each of the cables 205 and 206 can be slackened in the direction away from the other cable even if a guide member 33 is not provided.

More specifically, in the present exemplary embodiment, the guide member 33 need not be provided as long as the signal cable 205 projects (extends) in the direction away from the other cable in at least one of areas where it projects (extends) from the image reading device 200 or the image forming device 100 and the drive control cable 206 projects (extends) in the direction away from the other cable in at least one of areas where it projects (extends) from the image reading device 200 or the image forming device 100.

If the guide member 33 is provided so that the signal cable 205 and the drive control cable 206 are slackened in the directions away from each other while the image reading device 200 is closed, directions in which the two cables 205 and 206 project (extend) from the image reading device 200 and the image forming device 100 need not be the directions away from each other.

While two cables including the signal cable 205 and the drive control cable 206 for connecting the image forming device 100 and the image reading device 200 movable with respect to the image forming device 100 have been described in the present exemplary embodiment, the present invention is not limited to this. More specifically, the present invention is applicable to two cables configured to connect two devices relative positions of which can be changed.

According to the present invention, the directions in which the signal cable 205 and the drive control cable 206 project (extend) from the image reading device 200 and/or the image forming device 100 are thus contrived, so that the two cables 205 and 206 can be slackened in the directions away from each other while the image reading device 200 is closed. Further, the guide member 33 is provided, so that the two cables 205 and 206 can be slackened (bent) in the directions away from each other while the image reading device 200 is closed. As a result, the occurrence of the radiation noise can be suppressed at low cost.

A second exemplary embodiment will be described below. The second exemplary embodiment is applied to a similar image forming apparatus to that in the first exemplary embodiment. Therefore, similar units to those in the first exemplary embodiment are assigned the same reference numerals, and hence description thereof is not repeated.

In the first exemplary embodiment, the guide member 33 configured to guide the two cables 205 and 206 is fixed to the image forming apparatus 1 not to move. On the other hand, a guide member 233 in the present exemplary embodiment is configured to move in synchronization with opening/closing of an image forming device 100 with respect to an image reading device 200.

Figure 8A:
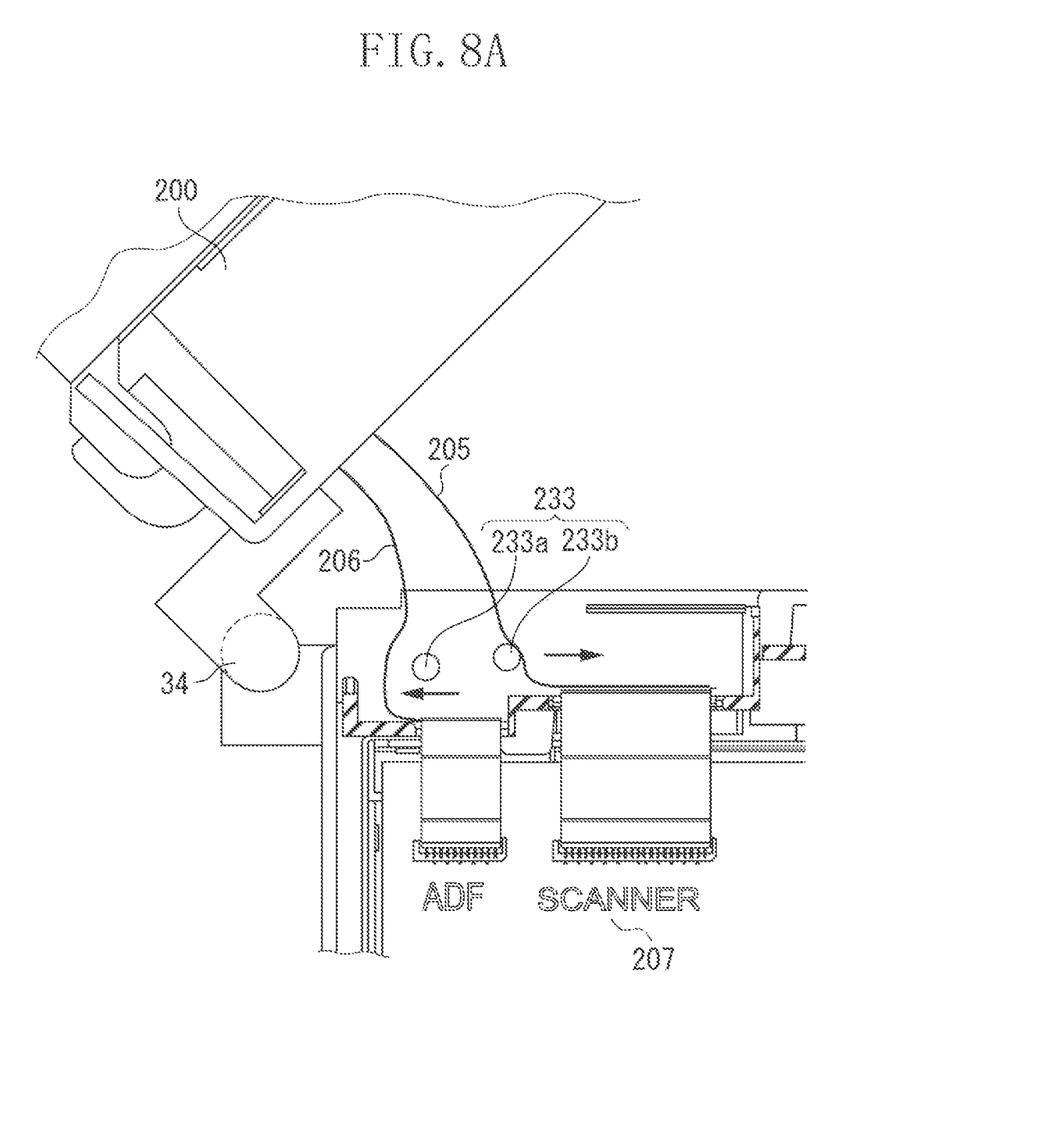
FIG. 8A is a cross-sectional view in the vicinity of the shaft 34 of the image forming apparatus with the image reading device opened from the left.
Figure 8B:
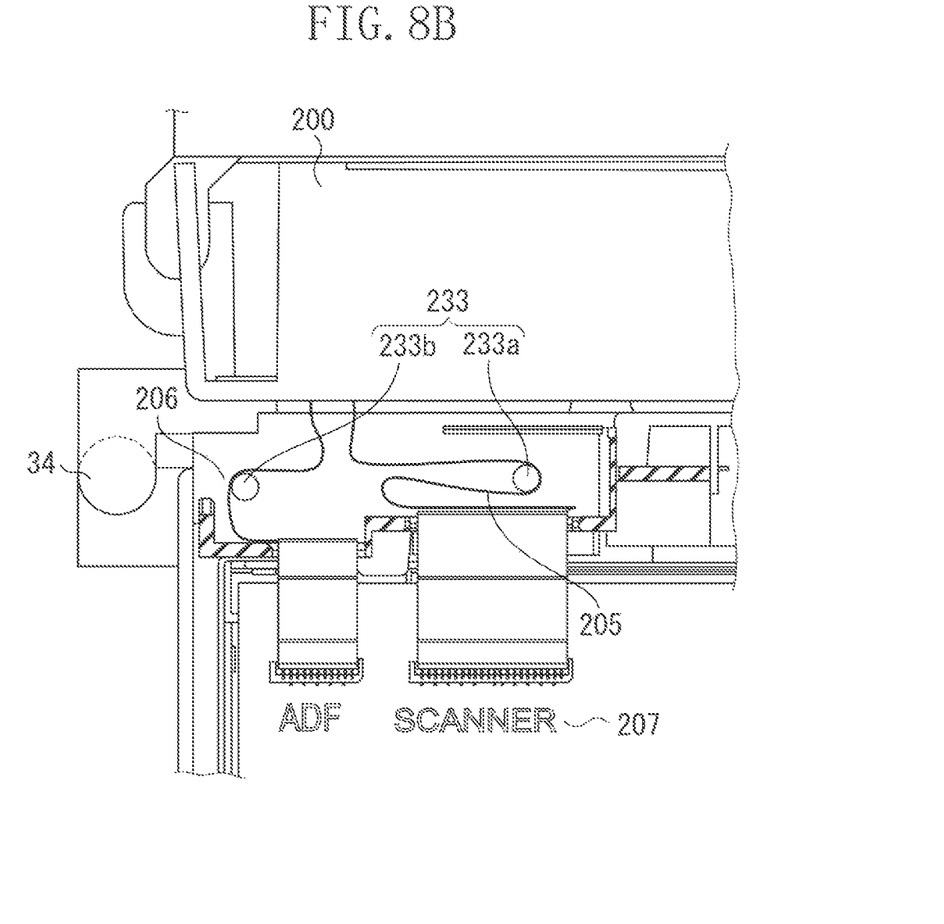
FIG. 8B is a cross-sectional view in the vicinity of the shaft 34 of the image forming apparatus with the image reading device closed as viewed from the left.

FIG. 8A is a cross-sectional view in the vicinity of a shaft 34 of an image forming apparatus 1 with the image reading device 200 opened as viewed from the left, and FIG. 8B is a cross-sectional view in the vicinity of the shaft 34 of the image forming apparatus 1 with the image reading device 200 closed from the left.

The guide member 233 (233a, 233b) is at a first position as illustrated in FIG. 8A while the image reading device 200 is opened. In this state, the guide member 233 retreats from cables 205 and 206, to avoid the cables 205 and 206 being prevented from connecting the image reading device 200 and the image forming device 100 as possible, unlike that in a second state, described below.

When the image reading device 200 is closed from this state, a link mechanism (not illustrated) causes the guide members 233a and 233b to respectively move in directions away from each other, as indicated by arrows, in synchronization with movement of the image reading device 200. When the guide members 233a and 233b thus move in the directions away from each other, the guide member 233a presses the cable 206, the guide member 233b presses the cable 205, to bend the cables 205 and 206 in the directions away from each other. As illustrated in FIG. 8B, the two cables 205 and 206 are bent in the directions away from each other.

In the present exemplary embodiment, the guide members 233a and 233b move in synchronization with the movement of the image reading device 200 with respect to the image forming device 100, to bend the two cables 205 and 206 in the directions away from each other. Even if the image forming apparatus is thus configured, generation of radiation noise can be suppressed at low cost, similarly to the first exemplary embodiment.

The guide member 233 retreats from the two cables 205 and 206 with the image reading device 200 opened, unlike that with the image reading device 200 closed, to avoid the cables 205 and 206 being prevented from connecting the image reading device 200 and the image forming device 100 as possible. When the image reading device 200 is closed, the guide member 233 moves, to bend the two cables 205 and 206. Therefore, the lengths of the two cables 205 and 206 with the image reading device 200 opened can be made smaller than those in the first exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:
1. An image forming apparatus comprising:
an image forming device configured to form an image on a sheet;

an image reading device configured to read an image on a document, wherein the image reading device is movable between a first position and a second position spaced farther apart from the image forming device than the first position around a rotation shaft;

a first cable that connects the image forming device and the image reading device to each other, one end of the first cable being fixed to the image forming device, the other end of the first cable being fixed to the image reading device, the first cable having a non-fixed region between a fixed portion at the one end and a fixed portion at the other end, the non-fixed region of the first cable being fixed to neither of the image forming device and the image reading device;

a second cable that connects the image forming device and the image reading device to each other and is located at a position closer to the shaft than the first cable is, one end of the second cable being fixed to the image forming device, the other end of the second cable being fixed to the image reading device, the second cable having a non-fixed region between a fixed portion at the one end and a fixed portion at the other end, the non-fixed region of the second cable being fixed to neither of the image forming device and the image reading device;

a first guide member that is provided at a position between the first cable and the second cable and regulates approaching of the first cable toward the second cable when the image reading device moves rotationally from the first position to the second position;

a second guide member that is provided at a position between the first cable and the second cable and regulates approaching of the second cable toward the first cable when the image reading device moves rotationally from the first position to the second position; and a third guide member that is provided at a position between the first cable and the second cable and regulates approaching of the first cable and the second cable toward each other when the image reading device moves rotationally from the second position to the first position, wherein the first guide member, the second guide member, and the third guide member are fixed to the image forming device below a top surface of the image forming device, and wherein, in a height direction, the third member is fixed to the image forming device above the first guide member and the second guide member and below the top surface of the image forming device.

2. The image forming apparatus according to claim 1, wherein the first guide member regulates the approaching of the first cable toward the second cable by coming into contact with the non-fixed region of the first cable.

3. The image forming apparatus according to claim 2, wherein the second guide member regulates the approaching of the second cable toward the first cable by coming into contact with the non-fixed region of the second cable.

4. The image forming apparatus according to claim 3, wherein the third guide member regulates the approaching of the first cable and the second cable toward each other by coming into contact with the non-fixed region of the first cable and the non-fixed region of the second cable.

5. The image forming apparatus according to claim 1, wherein the third guide member is fixed to the image forming device at a position closer to the image reading device than the first guide member and the second guide member are.

6. The image forming apparatus according to claim 1, wherein the first cable is a flexible flat cable having a plurality of electric wires formed therein in parallel alignment to have a planar shape.

7. The image forming apparatus according to claim 6, wherein the second cable is a flexible flat cable having a plurality of electric wires formed therein in parallel alignment to have a planar shape.

8. The image forming apparatus according to claim 1, wherein one of the first cable and the second cable sends an image signal from the image reading device to the image forming device, and the other cable sends a signal for controlling the image reading device from the image forming device to the image reading device.

* * * * *